(12) United States Patent
Hudgins et al.

(10) Patent No.: US 7,736,068 B2
(45) Date of Patent: Jun. 15, 2010

(54) WIRELESS TUNING AND RECONFIGURATION OF OPTOELECTRONIC MODULES

(75) Inventors: Clay E. Hudgins, Madison, AL (US); Daniel McGlynn, Albuquerque, NM (US)

(73) Assignee: Emcore Corporation, Albuquerque, NM (US)

( * ) Notice: Subject to any disclaimer, the term of this patent is extended or adjusted under 35 U.S.C. 154(b) by 0 days.

(21) Appl. No.: 12/394,199

(22) Filed: Feb. 27, 2009

(65) Prior Publication Data

US 2009/0162051 A1 Jun. 25, 2009

Related U.S. Application Data

(63) Continuation of application No. 11/776,494, filed on Jul. 11, 2007.

(51) Int. Cl.
G02B 6/42 (2006.01)
H04J 14/00 (2006.01)
H04B 10/12 (2006.01)

(52) U.S. Cl. .............................. 385/88; 398/58; 398/66; 398/71

(58) Field of Classification Search ....................... None
See application file for complete search history.

(56) References Cited

U.S. PATENT DOCUMENTS

| 6,240,312 B1 * | 5/2001 | Alfano et al. ................ 600/476 |
| 6,990,324 B2 * | 1/2006 | Laroia et al. .............. 455/226.1 |
| 2006/0045525 A1 * | 3/2006 | Lee et al. ...................... 398/71 |

* cited by examiner

*Primary Examiner*—Michelle R Connelly Cushwa (57) ABSTRACT

A method for adjusting a communications transmission characteristic, such as the optical wavelength, in an optoelectronic module having a tunable laser subassembly for converting and coupling an information-containing electrical signal with an optical fiber including a housing having an electrical input for coupling with an external cable or information system device and for transmitting and receiving information-containing electrical signals over such input, and a fiber optic connector adapted for coupling with an external optical fiber for transmitting and receiving an optical signal; and an electro-optic subassembly coupled to the information containing electrical signal and converting it to and/or from a modulated optical signal corresponding to the electrical signal.

15 Claims, 6 Drawing Sheets

WIRELESS TUNING AND RECONFIGURATION OF OPTOELECTRONIC MODULES

REFERENCE TO RELATED APPLICATIONS

This application is a continuation-in-part of U.S. patent application Ser. No. 11/776,494 filed Jul. 11, 2007.

This application is also related to U.S. patent application Ser. No. 11/712,725 filed Mar. 1, 2007, and U.S. patent application Ser. No. 11/620,317 filed Jan. 5, 2007, all assigned to the common assignee.

BACKGROUND OF THE INVENTION

1. Field of the Invention

The invention relates to optical communications devices, such as transmitters, receivers, and transceivers used in high throughput fiber optic communications links in local and wide area networks and storage networks, and in particular to the wirelessly monitoring and tuning the operational wavelength of such devices.

2. Description of the Related Art

Communications networks have experienced dramatic growth in data transmission traffic in recent years due to worldwide Internet access, e-mail, and e-commerce. As Internet usage grows to include transmission of larger data files, including content such as full motion video on-demand (including HDTV), multi-channel high quality audio, online video conferencing, image transfer, and other broadband applications, the delivery of such data will place a greater demand on available bandwidth. The bulk of this traffic is already routed through the optical networking infrastructure used by local and long distance carriers, as well as Internet service providers. Since optical fiber offers substantially greater bandwidth capacity, is less error prone, and is easier to administer than conventional copper wire technologies, it is not surprising to see increased deployment of optical fiber in data centers, storage area networks, and enterprise computer networks for short range network unit to network unit interconnection.

Such increased deployment has created a demand for electrical and optical transceiver modules that enable data system units such as computers, storage units, routers, and similar devices to be optionally coupled by either an electrical cable or an optical fiber to provide a high speed, short reach (less than 50 or 100 meters) data link within the data center.

A variety of optical transceiver modules are known in the art to provide such interconnection that include an optical transmit portion that converts an electrical signal into a modulated light beam that is coupled to a first optical fiber, and a receive portion that receives a second optical signal from a second optical fiber and converts it into an electrical signal, and similar implementations employ one fiber for both optical signals, traveling in opposite directions. The electrical signals are transferred in both directions over an electrical connectors that interface with the network unit using a standard electrical data link protocol.

The optical transmitter section of such transceiver modules includes one or more semiconductor lasers and an optical assembly to focus or direct the light from the lasers into an optical fiber, which in turn, is connected to a receptacle or connector on the transceiver to allow an external optical fiber to be connected thereto using a standard connector, such as SC, FC or LC. The semiconductor lasers are typically packaged in a hermetically sealed can or similar housing in order to protect the laser from humidity or other harsh environmental conditions. The semiconductor laser chip is typically a distributed feedback (DFB) laser with dimensions a few hundred microns to a couple of millimeters wide and 100-500 microns thick. For non-tunable lasers, the distributed feedback mechanism is commonly monolithically integrated into the laser gain cavity structure, resulting in an entire laser chip structure of the dimensions described above. For tunable lasers, a rapidly advancing technology, the distributed feedback mechanism may be physically external to the gain cavity structure, making the entire tunable laser much longer in one dimension than the laser chip dimensions described above, with specific dimensions varying widely among different tunable laser designs. The package in which they are mounted typically includes a heat sink or spreader, and has several electrical leads coming out of the package to provide power and signal inputs to the laser chips. The electrical leads are then soldered to the circuit board in the optical transceiver. The optical receive section includes an optical assembly to focus or direct the light from the optical fiber onto a photodetector, which in turn, is connected to a transimpedance amplifier/limiter circuit on a circuit board. The photodetector or photodiode is typically packaged in a hermetically sealed package in order to protect it from harsh environmental conditions. The photodiodes are semiconductor chips that are typically a few hundred microns to a couple of millimeters wide and 100 to 500 microns thick. The package in which they are mounted is typically from three to six millimeters in diameter, and two to five millimeters tall and has several electrical leads coming out of the package. These electrical leads are then soldered to the circuit board containing the amplifier/limiter and other circuits for processing the electrical signal.

Optical transceiver modules are therefore packaged in a number of standard form factors which are "hot pluggable" into a rack mounted line card network unit or the chassis of the data system unit. Standard form factors set forth in Multiple Source Agreements (MSAs) provide standardized dimensions and input/output interfaces that allow devices from different manufacturers to be used interchangeably. Some of the most popular MSAs include XENPAK (see www.xenpak.org), X2 (see www.X2msa.org), SFF ("small form factor"), SFP ("small form factor pluggable"), XFP ("10 Gigabit Small Form Factor Pluggable", see www.XFPM-SA.org), and the 300-pin module (see www.300pinmsa.org).

Customers and users of such modules are interested in small or miniaturized transceivers in order to increase the number of interconnections or port density associated with the network unit, such as, for example in rack mounted line cards, switch boxes, cabling patch panels, wiring closets, and computer I/O interfaces.

The identification of individual modules in connection with adjusting the operating characteristics of such modules is an important consideration network management. When customer requirements or network configurations or conditions change, users must reconfigure operational parameters components of the system.

Identification information, such as transceiver type, capability, serial number, compatibility information may be stored, or be capable of being stored, in a transceiver (see, for example, U.S. Patent Application Publication 2003/0128411). However, such information is generally not readily accessible for adjusting the operational parameters of such individual modules.

SUMMARY OF THE INVENTION

1. Objects of the Invention

It is an object of the present invention to provide an optoelectronic module in a small pluggable standardized form factor with wirelessly adjustable tunable wavelength.

It is also another object of the present invention to provide a module for use in an optical fiber transmission system with a tunable laser transmitter and an RFID for wirelessly externally communicating identification, wavelength, and/or other operational data to an external device.

It is still another object of the present invention to provide an optical transceiver with a wireless transceiver to be able to adjust the operational wavelength of the transceiver from an external network manager.

It is another object of the present invention to provide a method of adjusting the wavelength of an optical transceiver by a wireless RF interface.

It is also another object of the present invention to provide a method for identifying a module in an optical fiber transmission system when plugged into a host unit connected to a network using a portable terminal with a wireless communications interface to the module.

Some implementations may achieve fewer than all of the foregoing objects.

2. Features of the Invention

Briefly, and in general terms, the present invention provides a method for adjusting a communications transmission characteristic, such as the optical wavelength, in an optoelectronic module having a tunable laser subassembly for converting and coupling an information-containing electrical signal with an optical fiber including a housing having an electrical input for coupling with an external cable or information system device and for transmitting and receiving information-containing electrical signals over such input, and a fiber optic connector adapted for coupling with an external optical fiber for transmitting and receiving an optical signal; and an electro-optic subassembly coupled to the information containing electrical signal and converting it to and/or from a modulated optical signal corresponding to the electrical signal.

In another aspect, the present invention provides a data communication network including a plurality of network units and a plurality of pluggable optoelectronic modules coupled to one or more of such network units, the modules functioning to couple the associated network unit to an optical fiber for transmitting and/or receiving optical signals over such fiber, each module having a tunable laser transmitter having a wavelength that is selectable from a set of wavelengths, and means for communicating to an external device using a selected or predetermined wireless RF protocol to allow the external device to determine the wavelength in use and/or adjust the wavelength or other operational parameters.

In another aspect, the present invention provides a data communication network including a plurality of network units and a plurality of pluggable optoelectronic modules coupled to one or more of such network units, the modules functioning to couple the associated network unit to an optical fiber for transmitting and/or receiving optical signals over such fiber, each module having a tunable laser transmitter that is selectable from a set of wavelengths, and means for communicating to and/or from an external device using a wireless RF protocol to identify individual modules and their respective wavelengths.

Some implementations of the present invention may incorporate or implement fewer of the aspects and features noted in the foregoing summaries.

Additional objects, advantages, and novel features of the present invention will become apparent to those skilled in the art form this disclosure, including the following detailed description as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of utility.

BRIEF DESCRIPTION OF THE DRAWINGS

These and other features and advantages of this invention will be better understood and more fully appreciated by reference to the following detailed description when considered in conjunction with the accompanying drawings, wherein.

Additional objects, advantages, and novel features of the present invention will become apparent to those skilled in the art from this disclosure, including the following detailed description as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of utility.

DESCRIPTION OF THE PREFERRED EMBODIMENT

Details of the present invention will now be described including exemplary aspects and embodiments thereof. Referring to the drawings and the following description, like reference numbers are used to identify like or functionally similar elements, and are intended to illustrate major features of exemplary embodiments in a highly simplified diagrammatic manner. Moreover, the drawings are not intended to depict every feature of the actual embodiment nor the relative dimensions of the depicted elements, and are not drawn to scale.

The present invention relates generally to the identification of pluggable optical communications modules such as transmitters, receivers, and transceivers used in fiber optic communications systems, and the wireless adjustment of the operational wavelength or other operational parameters from a portable terminal in the general vicinity of the modules.

Figure 1:
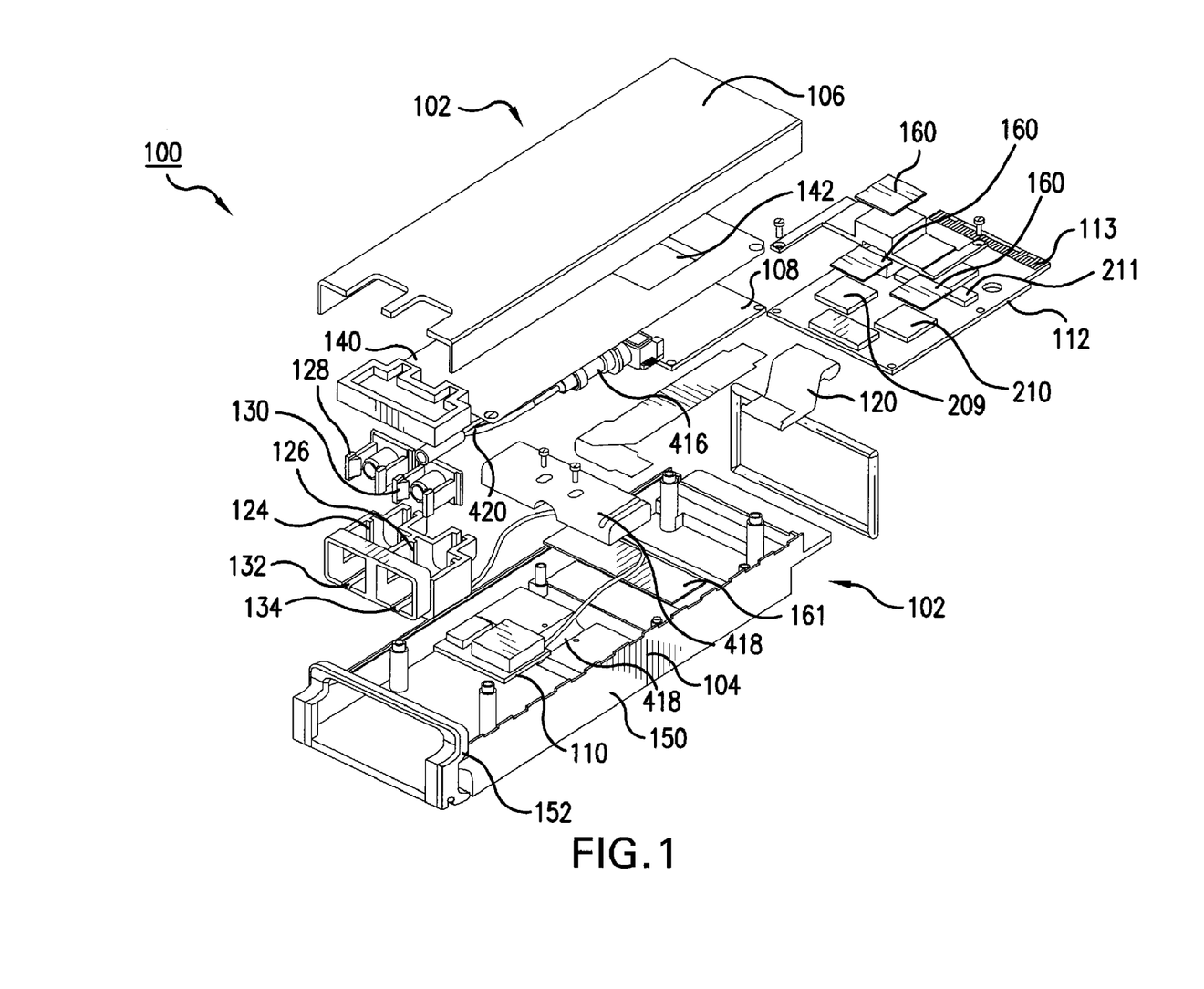
FIG. 1 is an exploded perspective view of an optoelectronic module in accordance with an illustrated embodiment of the invention.

Referring now to FIG. 1, there is shown an exploded view of an exemplary pluggable optical transceiver module 100 according to a preferred embodiment of the present invention. In this particular embodiment, the module 100 is compliant with the IEEE 802.3 Physical Media Dependent sub-layer (PMD) and is implemented in the XFP form factor having a length of 78 mm, a width of 18.35 mm, and a height of 8.5 mm. It is to be noted, however, that in other embodiments the transceiver module 100 may be configured to operate under various other standard protocols (such as Fibre Channel or SONET) and be manufactured in various alternate form factors such as XENPAK, X2, etc. The module 100 is preferably a 10 Gigabit Wide Wavelength Division Multiplexed (WWDM) transceiver having a single tunable laser that enables 300 meter transmission of an optical signal at least 300 meters over a single legacy installed multimode fiber or a distance from 10 to 40 km over a single standard single mode fiber. U.S. patent application Ser. No. 10/811,712, filed Mar. 29, 2004, now U.S. Pat. No. 7,257,142 is hereby incorporated by reference to illustrate a preferred tunable laser transmitter module.

The transceiver module 100 includes a two-piece housing 102 including a base 104 and a cover 106. In addition, contact strips (not shown) may be provided to ground the module to an external chassis ground as well. The housing 102 is constructed of die-cast or milled metal, preferably die-cast zinc, although other materials also may be used, such as aluminum, magnesium, specialty plastics and the like. Preferably, the particular material used in the housing construction assists in reducing EMI.

The front end of the housing 102 includes a faceplate 131 for securing a pair of receptacles 124, 126. The receptacles, 124, 126 are configured to receive fiber optic connectors (not shown) which mate with optical plugs 128, 130 respectively. In the preferred embodiment, the connector receptacles 124, 126 are configured to receive industry standard LC duplex connectors. As such, keying channels 132, 134 are provided to ensure that the LC connectors are inserted into the receptacles 124, 126 in their correct orientation. Further, as shown in the exemplary embodiment and discussed further herein, the connector receptacle 124 is intended for an LC transmitter connector, and the connector receptacle 126 receives an LC receiver connector.

In one embodiment, the housing 102 holds three subassemblies or circuit boards, including a transmit board 108, a receive board 110, and a physical coding sublayer (PCS)/physical medium attachment (PMA) board 112, which is used to provide an electrical interface to external computer or communications units (not shown). The transmit subassembly includes a single tunable laser module, which may be mounted in a single, hermetically sealed enclosure 415, which interfaces to a fiber coupling subassembly 416. The transmit board 108 is secured in place at the bottom of the housing a brace 418 attached to the coupling subassembly 416. The brace also functions as a heat sink for dissipating heat from the metallic fiber coupling subassembly 416 and hermetically sealed enclosure 415. In addition, the transmit board 108 and receive board 110 are connected to the PCS/PMA board 112 by respective flex interconnects 121 and 120, or other board-to-board electrical connectors or cables. Thermally conductive gap pads may be provided to transmit the heat generated by the lasers or other components in the transmitter subassembly to the base 104 or cover 106 of the housing, both of which act as a heat sink. The receiver subassembly 110 is directly mounted on the housing base 104 using a thermally conductive adhesive to achieve heat dissipation. Different subassemblies therefore dissipate heat to different portions of the housing for a more uniform heat dissipation. The output optical signal from the four lasers is multiplexed and input into a single optical fiber 420 which coils and reverses direction, and is preferably attached or mounted on a flexible substrate 140. The flexible material may be an optical flexible planar material such as FlexPlane™ available from Molex, Inc. of Lisle, Ill., although other flexible substrate may be used as well. The optical fiber 420 originating from the transmitter subassembly is thereby routed to the transmit optical connector plug 130, which is attached to the faceplate 131, which is attached to the housing 102. The fiber is routed and attached in such a manner as to minimize sharp bends in the optical fiber to avoid optical loss and mechanical failure.

The flexible substrate 140 may include an opening 142 or hole in a portion of the material that is located directly above the retimer IC or other heat generating components mounted on the PCS/PMA board 112. The opening 142, which is substantially an area the size of the unused portion of the substrate 140, enables the cover 106 which acts as a heat sink, to contact a heat transmission gap pad 160, so as to provide access and a heat conductive path to the mounted components on the board 112. This area on the board 112 normally would be inaccessible if not for the opening 142. The gap pad 160 is installed without interfering with the routing of the optical fibers on the substrate 140 and without removing the mounted substrate 140 to allow access to the PCS/PMA board 112.

Although the embodiment described above is a pluggable 10 Gigabit WWDM transceiver, the same principles are applicable in other types of optical transceivers suitable for operating over both multimode (MM) and single mode (SM) fiber using single or multiple laser light sources, single or multiple photodetectors, and an appropriate optical multiplexing and demultiplexing system. The design is also applicable to a single transmitter or receiver module, or a module as either a transmitter, receiver, or transceiver to communicate over different optical networks using multiple protocols and satisfying a variety of different range and distance goals.

Although in the depicted embodiment the transceiver 100 is manufactured in a modular manner using three separate subassemblies mounted in the housing—a transmitter subassembly, a receiver subassembly, and a protocol processing board—with each subassembly or board having dedicated functions and electrically connected to each other using either flex circuitry or mating multipin connectors, land grid arrays, or other electrical interconnect devices, the invention may also be implemented in a transceiver having a single board or subassembly mounted inside the housing.

Figure 2:
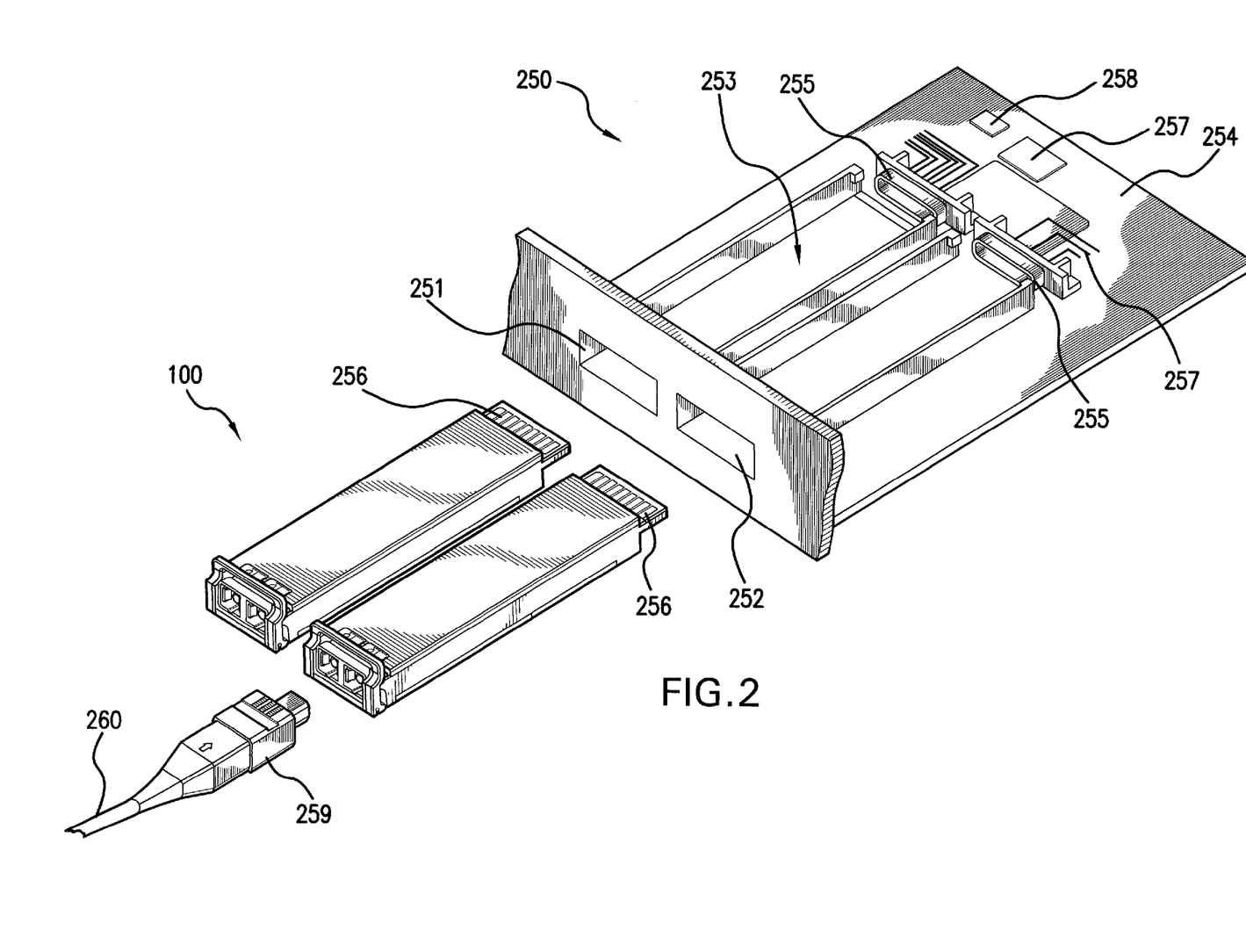
FIG. 2 is a perspective view of a module being inserted into a receptacle or cage in a host unit.

FIG. 2 is a perspective view of a module being inserted into a receptacle or cage in a host unit. The perspective view of the chassis 250 of the host unit or information system device for receiving a pluggable module according to the present invention depicts receptacles 251, 252 adapted for receiving a pluggable module 100, a cage 253 for securing the module adjacent to a printed circuit card 254, and an electrical connector 255 connected to the printed circuit card 254 and adapted for receiving the electrical connector 256 associated with the module. The printed circuit card 254 includes power and bus lines 257, a processor 258, and associated components such as memory 259. An optical cable connector 259 is employed to connect module 100 to the host optical cable plant 260.

Figure 3:
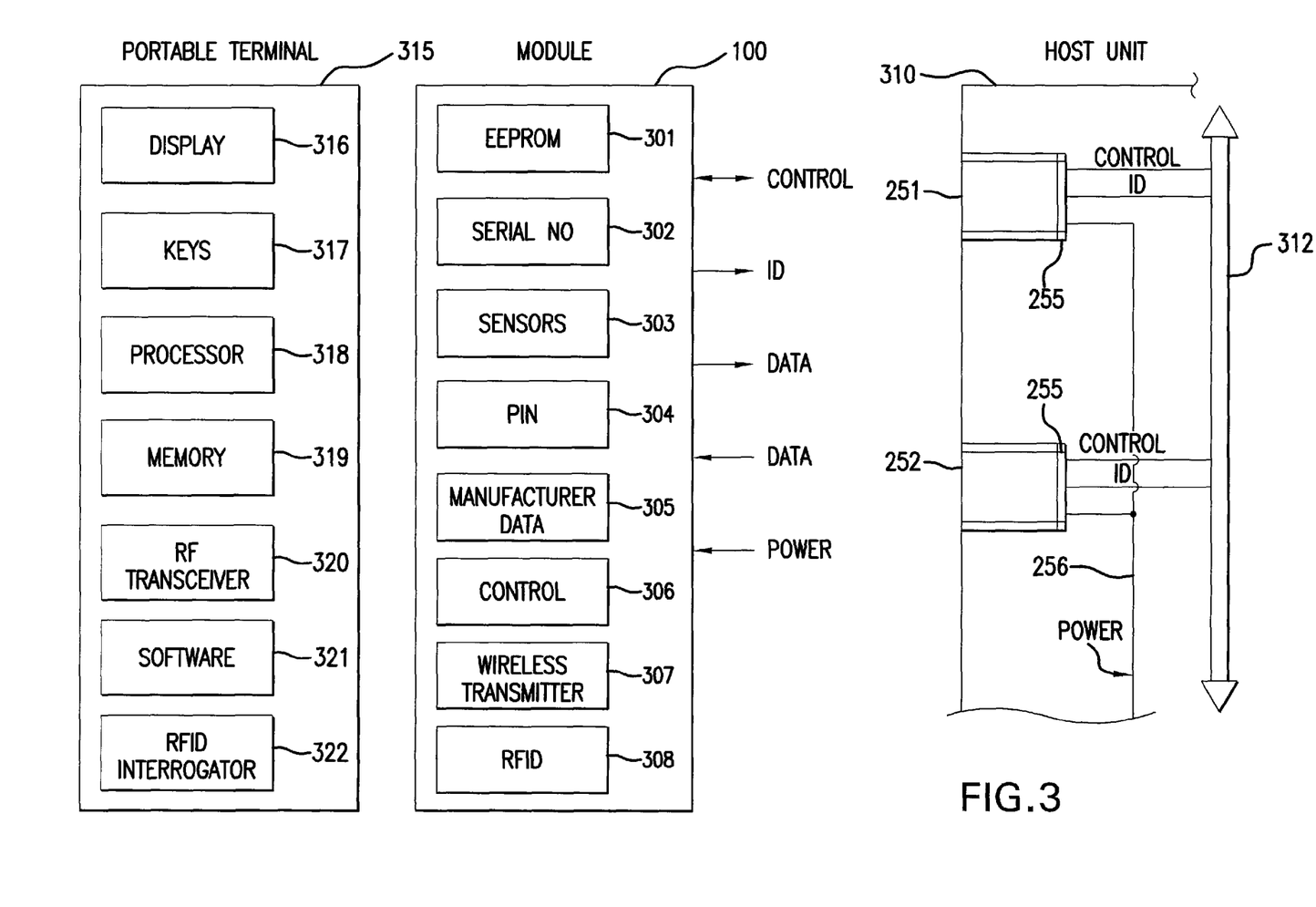
FIG. 3 is a highly simplified block diagram of certain elements of the module, the host unit, and a remote terminal.

FIG. 3 is a highly simplified block diagram of certain elements of the module 100, the host unit 310, and a portable terminal 315. In particular, the module 100 may include an EEPROM 301 for temporarily storing parametric data, a serial number ROM 302 which contains the identity of the manufacturer and the manufacturer's serial number and type of the module. The sensors 303 may acquire the parametric data described in connection. A PIN or cryptographic key 304 may also be provided, which is utilized to verify the authorization of the module, or its validity, to the host unit prior to the module being capable of operation, or for authorizing operational changes to be made to the module as described in parent application Ser. No. 11/776,494, hereby incorporated by reference.

Various operational control data, such as laser wavelength, output power, modulator or signal chirp, etc. may be stored in look-up tables, or actively controlled by subassembly 341. Control software 306 is provided to coordinate operation of the various stored or adjustable items and the communications from the host unit 310 or the portable terminal 315. One or more wireless transceiver or receivers 307 may provide means for receiving control instructions via infrared or RF communication from the portable terminal 315, with a MAC address 340 being provided to the module. An RFID transponder 308 may also be provided.

A Media Access Control address (MAC address) is a unique identifier associated with a network adapter (NIC), such as a wireless local area network (WLAN) card plugged into a laptop computer. More particularly, it is a Level 2 address in the OSI layer architecture. It is a number that acts like a name for the associated network adapter, and thereby the host computer associated with the adapter.

As the name implies, a MAC address is associated with the media interface which the host unit or module is utilizing for communication. Thus, a MAC address associated with a wireless interface adapter (i.e. a wireless local area network link) could be different than the Ethernet address if the same host were connected over a wired Ethernet link.

Short-range wireless communication capability is becoming more widespread in use in a variety of different mobile devices such as portable terminals, cellular phones, personal digital assistants, pagers, MP3 players, and other mobile devices. Such devices may include short-range communication receivers or transceivers, so that the devices have the ability to communicate via RFID, Bluetooth, IEEE 803.11, IEEE 803.15, infrared or other types of short-range communication protocols dependent upon the application and type of receiver or transceiver associated with the mobile device.

Figure 5:
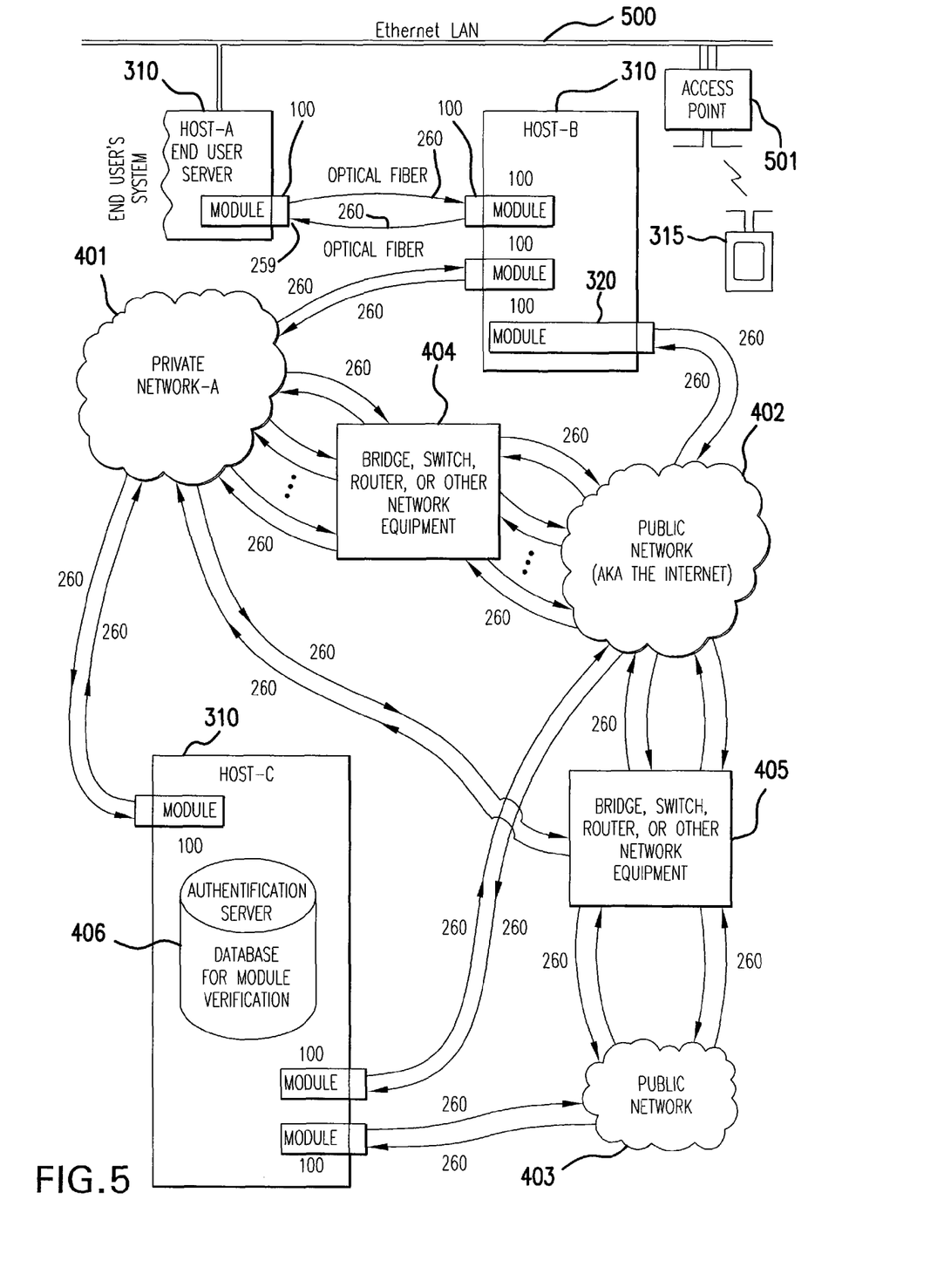
FIG. 5 is a highly simplified diagram of a computer network in which the present invention may be employed.

The portable terminal 315 is preferably equipped with short-range wireless LAN communication transceiver, so as to be capable of accessing both the module 100 and an external network (as depicted in FIG. 5) for further information and services.

The host unit 310 is depicted as including a slot or receptacle 251, 252 for insertion of the module 100 with an electrical connector 255 in the rear of the case 253 for mating with the electrical connector 256 on the module 100. In this representation, there is also depicted a set of control and ID lines from each connector 255 connected to an internal bus 312 in the host unit 310. A power line 256 is also provided in host unit 310 which connects to each connector 255.

The portable terminal 315 may preferably include a display 316, keyboard or data entry buttons 317 (or touch screen display), a processor 318, memory 319, an infrared or RF transceiver 320, and an RFID interrogator 322. Software 321 is also provided for a variety of operations and applications to be subsequently described.

One key aspect of the present invention is that operational data associated with the module 100 may be transmitted to the module to a technician or a real time computer program referred to as a network manager, either along the wired connection from the host unit 310, or preferably wirelessly by short range RF communication to and from the portable terminal 315 used in the vicinity of the modules (i.e. in the same room or data center).

In addition to displaying the operational status and condition of a particular module, the software 321 in the terminal will allow the user to make operational changes in the module. By operational changes we include change of wavelength, change in launch power, change in modulation technique, chirp, error correction technique, payload size, communications protocol, packet control fields, encoding (e.g. 8 B/10 B), etc.

One aspect of the invention is the use of the RFID's Identifier Address/Code as a value written within the address space of the XFP module. The RFID Tag and RFID Tag Reader are conventionally thought of as a separate system from the device to which the RFID Tag is attached.

Specifically, the present invention associates or relates one particular XFP Module and to one particular RFID Tag, and then furthermore writing that particular RFID Tag's Identifier Address/Code into that particular XFP Module's Nonvolatile Memory. This feature opens up the possibility of a number of useful hardware/software behaviors previously unavailable.

Bluetooth technology seems ideal for the wireless data communication, except for limitations in address space and network size. Second, RFID seems ideal for identifying the modules, and its 96 bit address space seems appropriate for the environment where manufacturers will want to identify their products both by a unique Universal Product Code (UPC) plus their own unique serial number.

Indeed, Bluetooth (see the Bluetooth Special Interest Group homepage at http://www.bluetooth.org/) seems ideal for radio frequency (RF) communication with an XFP module, except for architectural limitations in network size, typically eight devices to a piconet. (http://en.wikipedia.org/wiki/Bluetooth, http://www.bluetooth.com/Bluetooth/Technology/Works/Communications_Topology.htm). Other than addressing limitations (48 bit total address space) and small piconet (3 bit address space), Bluetooth would seem ideal for communication with XFP modules, with advantages including:

(a) Frequency hopping spread spectrum communication for good electromagnetic noise avoidance/immunity in crowded equipment rooms.

(b) Low power (1 mW) frequency hopping spread spectrum communication for minimal electromagnetic interference/noise generation in crowded equipment rooms.

(c) Variable power transmission (1 mW, 2.5 mW, and 100 mW) for different applications.

(d) Low cost due to extensive commercial deployment.

Concerning address space, a manufacturer is reasonably expected to wish to identify their product by its UPC (Universal Product Code) now or in the future the superset of UPC called EAN-13 (European Article Number) as standardized by the international standards body GS1 (http://www.gs1.org/). Even taking the simpler UPC code requires approximately 1E+12 (1 followed by 12 zeros, one trillion) combinations. Even the most clever possible use of the 48 bit Bluetooth address with the UPC code would leave less than 9 bits available for manufacturers' serial numbers (less than 512 unique serial numbers), which is clearly inadequate. So, Bluetooth's 48 bit address space seems inadequate to uniquely address manufactured items such as XFP modules by UPC code and serial number.

In contrast, use of the 96 bit RFID address space with even an inefficient packing of the 17 decimal digit EAN-13 product code will leave over 39 bits for manufacturer serial numbers, which represents over one-half trillion available unique serial numbers per unique product number. So, RFID's 96 bit address space seems more than adequate to uniquely address manufactured items such as XFP modules by UPC/EAN-13 code and serial number.

Seeing then that the RFID has desirable and sufficient address space and that the Bluetooth system has desirable and sufficient wireless networking capabilities for the task at hand, one aspect of the invention is to combine the two technologies for controlling and interrogating XFP modules.

The end application as contemplated by the preset invention, is for a User (technician, engineer, operator, etc.) to be able to walk into a network operating center carrying a battery powered Transponder Manager device (e.g., the portable terminal 315) that contains both a Bluetooth controller and an RFID reader. As the Transponder Manager queries individual RFID Tags (which are part of the XFP modules) the Bluetooth systems within those XFP modules wake up and make themselves available for pairing. The Transponder Manager's Bluetooth Controller may then pair with any XFP module, using the RFID Tag and its unique address to resolve any addressing ambiguities with other XFP module by ambiguity resolution techniques that are already well know. Once the Transponder Manager's Bluetooth Controller has paired with a particular XFP module's Bluetooth Controller, the XFP module's address space contains a copy of the RFID's ID value, which can used to complete the verification of the unique identity of the XFP module. Security mechanisms already existent in Bluetooth provide one layer of security, and XFP MSA mechanisms for protecting the XFP EEPROM provide yet another layer of security.

Having done all this, the User and his/her hand-held battery powered Transponder Manager now have a unique Bluetooth connection with the XFP module that they have chosen. Now, this full featured Bluetooth communication link may be used to control or interrogate/query any aspect of the XFP module that one can imagine. The Bluetooth connection will have all the power and utility of the two wire interface (similar to Phillips I2C) that is implemented within every XFP module.

In short, this Bluetooth link can do everything that the normal 2-wire interface can do. This will include complete access to all management features including tuning of the lasers, and complete access to all embedded parametric monitoring data.

In addition to the components noted above, portable terminals may utilize other data entry media such as magnetic stripe cards, RFID tags, biometric sources, SIM devices, smart cards, electronic key access cards, or the like, as well as a printer for providing a display or print-out of the information transmitted and/or received by the terminal.

Figure 4:
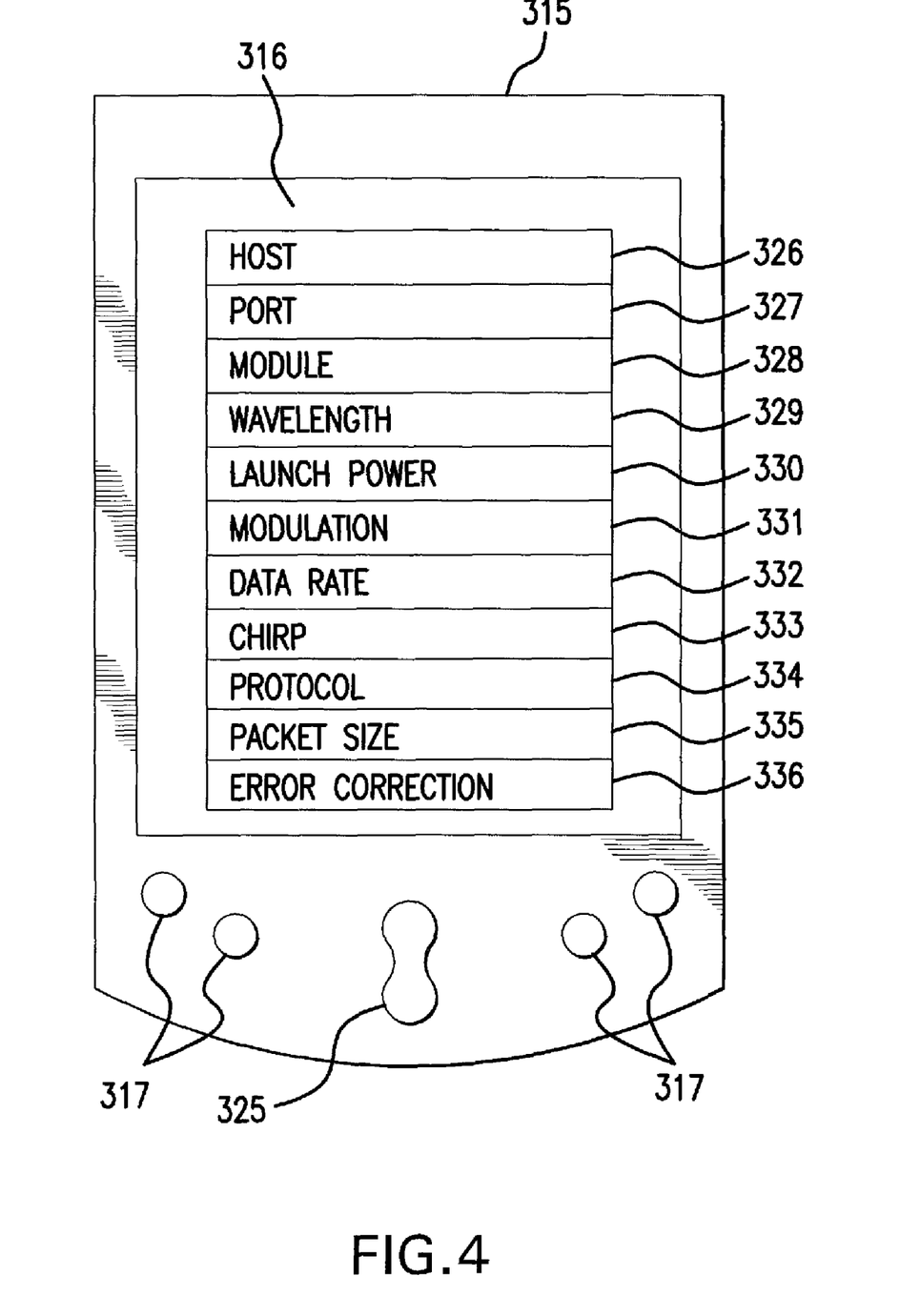
FIG. 4 is a top plan view of a portable terminal used in an embodiment of the present invention.

FIG. 4 is a top plan view of an embodiment of a portable terminal 315 with a display 316 depicting the various parameters and data that may be acquired in real time from the module by wireless transmission and displayed to the user, who may be a maintenance technician in the vicinity of the host units, and checking on the operational status and condition of the modules 100 associated with a host unit.

In particular, FIG. 4 depicts a variety of buttons 317, a scroll button 325, used to adjust the display. An example of the type of data that may be displayed when the portable terminal 315 is in communications range with one or more modules 100 includes identification of the host 326, identification of the port 327, identification of the module (e.g. by serial number or customer identification number) 328, identification of the wavelength in use by the module 329, the launch power 330, the modulation technique 331, the data rate 332, the chirp 333, the protocol 34, the packet size 335, and one or more other operational data fields 336 such as the error correction technique, payload size, etc.

FIG. 5 shows a computer or data communications network as might be employed in multi-site enterprise information systems, and a possible typical configuration or interconnection between a plurality of modules 100 associated with different hosts, several hosts 310 (identified as Host-A, Host-B, and Host-C, a portable or mobile terminal 315, and an authentication server 406. In some instances, the modules 100 may be on the same private network 401 as the authentication server 406. In other cases, the modules 100 may connect directly to the public network 402, such as the Internet. An Ethernet LAN 500 is associated with Host-A 310, including an access point 501.

Similarly, the authentication server may connect to the Internet 402 or one or more private networks 401, 403. When a module 100 and authentication server are on separate private networks, these private networks may be connected directly together by network equipment (bridge, router, or switch) 405.

Alternately, when the module 100 and authentication server 406 are on separate private networks 401, 403, these private networks may first connect to the Internet 402 via network equipment 404, 405 in order to form the necessary end-to-end connectivity between the module 100 and the authentication server 406.

Moreover, a plurality of authentication servers 406 may be distributed around the network for improved fault tolerance and/or improved speed of access. In the case of a plurality of authentication servers 406, these authentication servers will periodically synchronize their databases among themselves.

Figure 6:
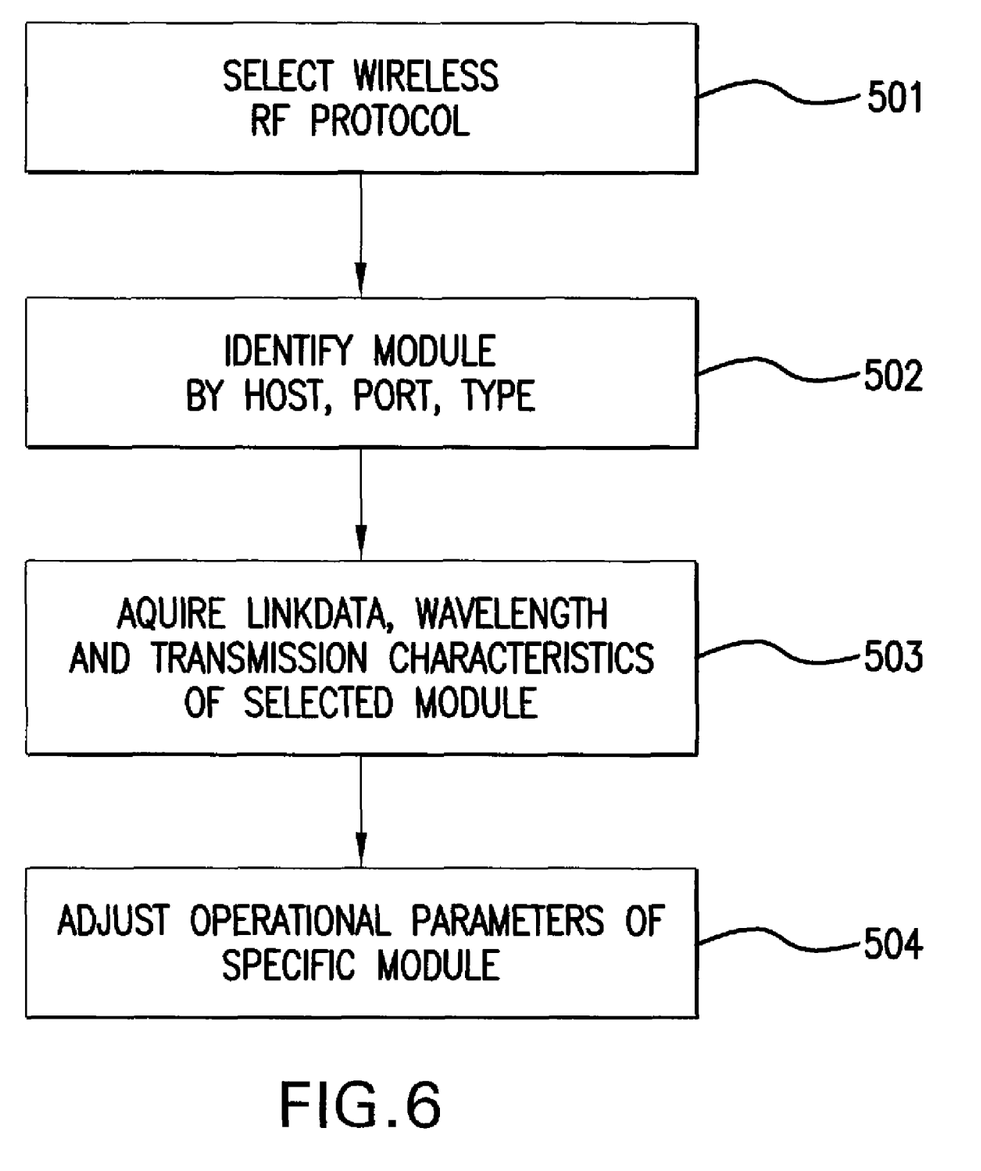
FIG. 6 is a flow chart depicting access of modules by a portable terminal.

FIG. 6 is a flow chart depicting the operations performed by the portable terminal 315 as used by a technician in a data center in checking or reconfiguring the modules during use. In particular, at step 501, the technician performs initialization by selecting the wireless protocol (e.g. RFID, Bluetooth, 802.11, 802.15, etc.). After scanning (at step 502) the identity of the modules within range (e.g by host, part number, etc.) the technician selects one of interest, and the portable terminal acquires the link data, such as the wavelength and other transmission characteristics of the selected module at step 503.

If the module and/or network is to be reconfigured, the technician can then adjust the operational parameters of the selected modules as may be required, as represented at step 504.

Various aspects of the techniques and apparatus of the present invention may be implemented in digital circuitry, or in computer hardware, firmware, software, or in combinations or them. Circuits of the invention may be implemented in computer products tangibly embodied in a machine-readable storage device for execution by a programmable processor, or on software located at a network node or web site which may be downloaded to the computer product automatically or on demand. The foregoing techniques may be performed by, for example, a single central processor, a multi-processor, one or more digital signal processors, gate arrays of logic gates, or hardwired logic circuits for executing a sequence of signals or program of instructions to perform functions of the invention by operating on input data and generating output. The methods may advantageously be implemented in one or more computer programs that are executable on a programmable system including at least one programmable processor coupled to receive data and instructions from, and to transmit data and instructions to, a data storage system at least one in/out device, and at least one output device. Each computer program may be implemented in a high-level procedural or object-oriented programming language, or in assembly or machine language if desired; and in any case, the language may be compiled of interpreted language. Suitable processors include, by way of example, both general and special purpose microprocessors. Generally, a processor will receive instructions and data from read-only memory and/or random access memory. Storage devices suitable for tangibly embodying computer program instructions and data include all forms of non-volatile memory, including by way of example, semiconductor devices, such as EPROM, EEPROM, and flash memory devices; magnetic disks such as internal hard disks and removable disks; magneto-optical disks; and CD-ROM disks. Any of the foregoing may be supplemented by or incorporated in specially designed application-specific integrated circuits (ASICS).

It will be understood that each of the elements described above, or two or more together, also may find a useful application in other types of constructions differing from the types described above.

While the invention has been illustrated and described as embodied in an optical module or pluggable transceiver, among other devices, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

The invention claimed is:

1. A method for wirelessly adjusting the wavelength of an optoelectronic module for coupling an information system device with an optical fiber, having a housing including an electrical connector for coupling with an external electrical cable or information system device and for transmitting information-containing electrical signals over said connector, and a fiber optical connector adapted for coupling with an external optic fiber for transmitting and/or receiving an optical signal; and an electro-optic subassembly disposed in said housing coupled to the information system device for converting the electrical signal to or from a modulated optical signal corresponding to the electrical signals at a selectable wavelength, comprising:
   determining the identity of the optoelectronic module and the information system device; and
   wirelessly transmitting a signal to the optoelectronic module for adjusting the selectable wavelength for subsequent communications.

2. The method of claim 1, wherein the optical communications protocol used by the optoelectronic module is selected from the group consisting of SONET, Gigabit Ethernet, 10 Gigabit Ethernet, Fibre Channel and SDH.

3. The method of claim 1, wherein the electrical connector is selected from the group consisting of Infiniband, XAUI and XIF.

4. The method of claim 1, wherein the housing is selected from the group consisting of XENPAK, X2, SFF, SFP, XFP, or QSFP form factors.

5. The method of claim 1, wherein the steps of determining the identity and wirelessly transmitting is performed by a portable terminal using at least one RF communications protocol.

6. The method of claim 5, wherein the determining step utilizes the Bluetooth communications protocol.

7. The method of claim 1, further comprising wirelessly transmitting a signal to select the output power of the laser.

8. The method of claim 1, further comprising wirelessly transmitting a signal to adjust an additional communications transmission characteristic of the module.

9. The method of claim 8, wherein the communications transmission characteristic is the communications protocol.

10. The method of claim 8, wherein the communications transmission characteristic is the data in the control field of the packet being transmitted.

11. The method of claim 8, wherein the communications transmission characteristic is the data rate.

12. The method of claim 8, wherein the communications transmission characteristic is the packet size of the packet being transmitted.

13. The method of claim 8, wherein the communications transmission characteristic is the error correction methodology.

14. The method of claim 13, wherein the error correction methodology is forward error correction.

15. The method of claim 8, wherein the communications transmission characteristic is the optical modulation technique.

* * * * *